United States Patent [19]

Meguriya et al.

[11] Patent Number: 5,618,631
[45] Date of Patent: Apr. 8, 1997

[54] SILICONE RUBBER/EPOXY RESIN INTEGRAL COMPOSITE AND METHOD FOR MAKING

[75] Inventors: Noriyuki Meguriya; Takeo Yoshida, both of Usui-gun, Japan

[73] Assignee: Shin-Etsu Chemical Co., Ltd., Tokyo, Japan

[21] Appl. No.: 409,591

[22] Filed: Mar. 24, 1995

[30] Foreign Application Priority Data

Mar. 25, 1994 [JP] Japan .................................. 6-079819

[51] Int. Cl.$^6$ .................................................. B32B 27/38
[52] U.S. Cl. .......................................... 428/513; 525/476
[58] Field of Search ............................ 525/476; 428/413

[56] References Cited

U.S. PATENT DOCUMENTS

| | | | |
|---|---|---|---|
| 3,131,161 | 4/1964 | Nitzsche et al. | 525/476 |
| 3,681,517 | 8/1972 | Meyn | 428/413 |
| 4,082,719 | 4/1978 | Liles et al. | 260/37 SB |
| 4,233,428 | 11/1980 | Endo | 525/507 |
| 4,395,462 | 7/1983 | Polmanteer | 428/420 |
| 4,454,201 | 6/1984 | Uram, Jr. | 428/413 |
| 4,582,762 | 4/1986 | Onohara et al. | 428/447 |
| 4,604,435 | 8/1986 | Koshii et al. | 525/476 |
| 4,686,124 | 4/1987 | Onohara et al. | 428/35 |
| 4,814,231 | 3/1989 | Onohara et al. | 428/425.5 |
| 4,834,721 | 5/1989 | Onohara et al. | 604/266 |
| 4,853,434 | 8/1989 | Block | 525/100 |
| 4,880,882 | 11/1989 | Morita et al. | 525/446 |
| 4,904,761 | 2/1990 | Okitsu et al. | 523/435 |
| 5,223,262 | 6/1993 | Kim et al. | 424/448 |

FOREIGN PATENT DOCUMENTS 276790A 8/1988 European Pat. Off. .
63-45292 3/1985 Japan .

OTHER PUBLICATIONS

Abstract of JP 63–45292.

*Primary Examiner*—Margaret W. Glass
*Attorney, Agent, or Firm*—Millen, White, Zelano, & Branigan, P.C.

[57] ABSTRACT

A cured product of an epoxy resin composition is integrally and firmly joined to a cured product of an organic peroxide—or addition reaction-curable silicone rubber composition to form an integral composite. The integral composite having practically acceptable adhesion force can be simply and briefly produced without using a primer.

11 Claims, 1 Drawing Sheet

EPOXY RESIN (A)

SILICONE RUBBER/EPOXY RESIN INTEGRAL COMPOSITE AND METHOD FOR MAKING

BACKGROUND OF THE INVENTION

1. Field of the Invention

This invention relates to a silicone rubber/epoxy resin integral composite and more particularly, an integral composite comprising an organic peroxide-cured or addition reaction-cured silicone rubber firmly integrated with a cured epoxy resin useful in electric and electronic parts, business machines, automobiles, and precision equipment. It also relates to a method for preparing such an integral composite.

2. Prior Art

In the recent years, silicone rubbers have been expanding their application in the fields of electric and electronic parts, business machines, and automobiles because they are acknowledged highly reliable with respect to heat resistance, weather resistance, and electric properties. On the other hand, epoxy resins which are thermosetting resins also find a wide variety of applications because of excellent electrical and mechanical properties and adhesion. It is thus desired to have a composite of silicone rubber and epoxy resin. There is a need for integral molded parts wherein the two components are firmly joined.

A number of attempts have been made for joining silicone rubber and organic resins together. For example, (1) a molded resin on the surface is coated with a primer and a curable silicone rubber is applied thereon and cured. (2) A self-adhesive silicone rubber material is cured to a molded resin. (Note that there are available a number of patents relating to self-adhesive silicone rubber compositions, especially adhesive components thereof.) (3) An organopolysiloxane containing more than 30 mol % of a hydrogen atom directly attached to a silicon atom is added to an organic resin which is joined to an addition curing type silicone rubber (see U.S. Pat. No. 4,582,762, U.S. Pat. No. 4,686,124, U.S. Pat. No. 4,814,231 and U.S. Pat. No. 4,834,721 corresponding to JP-B 34311/1990). (4) A silicone rubber is physically fitted in an organic resin (see JP-B 45292/1988). (5) A silicone rubber is integrally joined to an olefin resin having grafted thereto a compound having an aliphatic unsaturated group and a hydrolyzable group attached to a silicon atom (see EP 276790A corresponding to JP-A 183843/1988).

However, method (1) using a primer is cumbersome in that a resin molding must be taken out of a mold before a primer can be applied. Method (2) of curing a self-adhesive silicone rubber material to a molded resin has the serious problem that when the silicone rubber-coated resin is molded in a mold, the silicone rubber itself adheres to the mold. Method (3) of adding an organopolysiloxane to a resin has the problem that it is difficult for the resin to exert its inherent properties because the properties of the resin itself can be altered by the siloxane added thereto. Method (4) has a likelihood that physical engagement be disrupted by physical forces. Method (5) requires a primer for the integration of an addition curing type silicone rubber.

SUMMARY OF THE INVENTION

An object of the present invention is to provide a composite wherein a cured epoxy resin is firmly integrated with silicone rubber. Another object of the present invention is to provide a method for preparing such a composite in a simple effective manner.

We attempted to produce an integral composite or molding of silicone rubber and organic resin which are difficult to join together or can be joined together through complex steps as by interposing a primer layer in the prior art. By selecting an organic peroxide-curable silicone rubber composition or addition reaction-curable silicone rubber composition as the silicone rubber and an epoxy resin composition as the organic resin, we have succeeded in producing an integral composite body having practically acceptable adhesion force within a short time in a simple manner without using a primer.

More particularly, we have found that by curing either one of an organic peroxide—or addition reaction-curable silicone rubber composition and an epoxy resin composition at room temperature or elevated temperature, placing the other composition in close contact with the cured or semi-cured composition, and curing the other composition at room temperature or elevated temperature, there is obtained a composite wherein the cured epoxy resin is firmly and integrally joined to the silicone rubber.

Briefly stated, the invention provides an integral composite wherein an organic peroxide-cured or addition reaction-cured silicone rubber is integrally joined to a cured epoxy resin.

BRIEF DESCRIPTION OF THE DRAWINGS

The only figure.

DETAILED DESCRIPTION OF THE INVENTION

Figure 1:
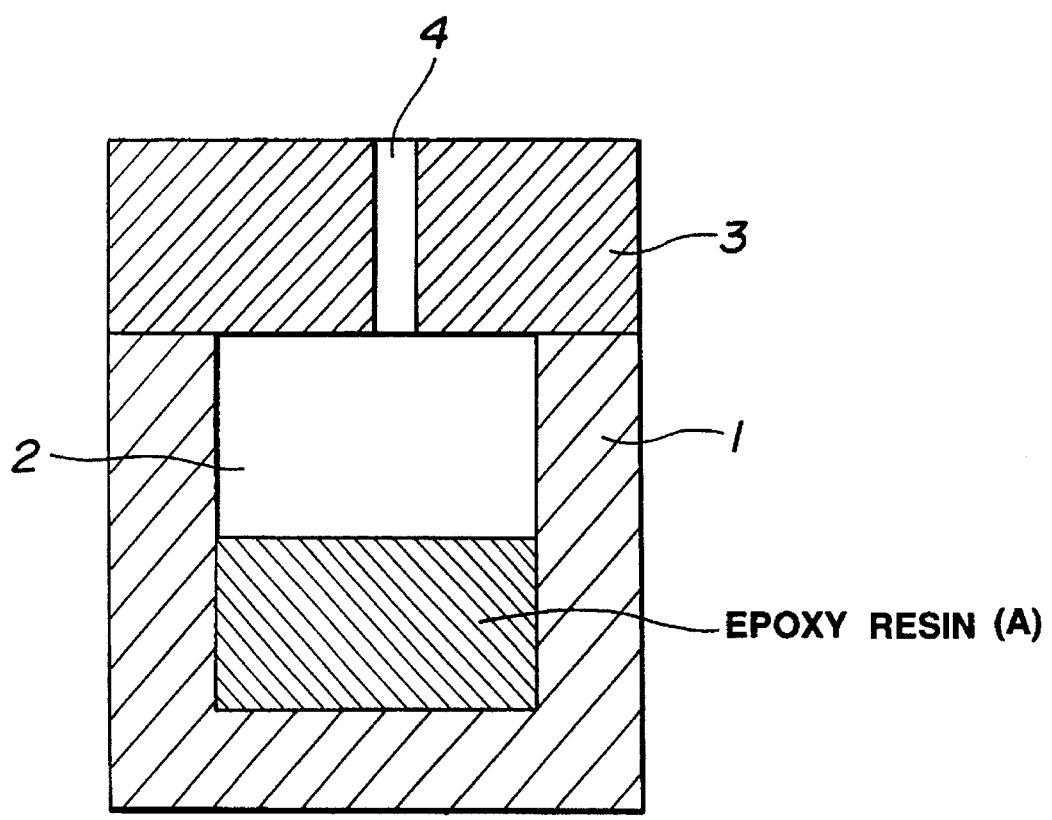
FIGURE 1 is a cross-sectional view of a mold used for integral molding of epoxy resin and silicone rubber in the Examples.

The organic peroxide-cured silicone rubber is preferably obtained by curing a silicone rubber composition predominantly comprising (a) an organopolysiloxane having the following general formula (1):

wherein $R^1$ is a substituted or unsubstituted monovalent hydrocarbon group having 1 to 10 carbon atoms, preferably 1 to 8 carbon atoms, 0.005 to 20 mol %, preferably 0.01 to 10 mol % of $R^1$ is an alkenyl group, and letter a is a positive number of from 1.9 to 2.4, preferably from 1.95 to 2.2, and containing on average at least two alkenyl groups in a molecule, and (b) a catalytic amount of an organic peroxide.

In component (a), the alkenyl group-containing organopolysiloxane of formula (1), examples of the monovalent hydrocarbon group represented by $R^1$ include alkyl groups such as methyl, ethyl, isopropyl, butyl, isobutyl, tert-butyl, hexyl, cyclohexyl, octyl, decyl and propyl, alkenyl groups such as vinyl, allyl, propenyl and butenyl, aryl groups such as phenyl and xylyl, aralkyl groups such as benzyl and phenylethyl, and halo- and cyano- substituted hydrocarbon groups such as chloromethyl, bromoethyl, cyanoethyl and 3,3,3-trifluoropropyl. Although the substituents represented by $R^1$ may be identical or different, 0.005 to 20 mol %, preferably 0.01 to 10 mol %, more preferably 0.1 to 5 mol % of $R^1$ is an alkenyl group and the organopolysiloxane must contain on average two or more alkenyl groups in a molecule. Basically the substituent $R^1$ may be any of the above-mentioned groups. Preferably the alkenyl group is vinyl, and methyl and phenyl groups are desirably introduced as other substituents. The alkenyl groups are bonded to silicon atoms at the molecule ends and/or in the intermediate portion of the main chain of the molecule. Preferably, the alkenyl groups are bonded to silicon atoms at both molecule ends from the viewpoint of a curing rate and a cured product physical property. Letter a is a positive number having a value in the range of 1.9 to 2.4, preferably 1.95 to 2.2. The alkenyl-containing organopolysiloxane may be either a straight chain one or a branched one containing $R^1SiO_{3/2}$ and $R^1SiO_{4/2}$ units, which basically has a main chain of the recurring unit of $R_2^1SiO_{2/2}$ (diorganosiloxane unit) blocked with $R_3^1SiO_{1/2}$ units (triorganosiloxane unit) at both molecular ends.

Preferably the alkenyl-containing organopolysiloxane has a viscosity of 100 to 1,000,000 cp at 25° C., especially 500 to 500,000 cp at 25° C.

The organopolysiloxane can be prepared by conventional well-known methods, for example, by effecting equilibration reaction between an organocyclopolysiloxane and a hexaorganodisiloxane in the presence of an alkali or acid catalyst.

Component (b), organic peroxide, is a catalyst for promoting crosslinking reaction of component (a), the alkenyl-containing organopolysiloxane. Illustrative, but non-limiting examples of the organic peroxide are given below.

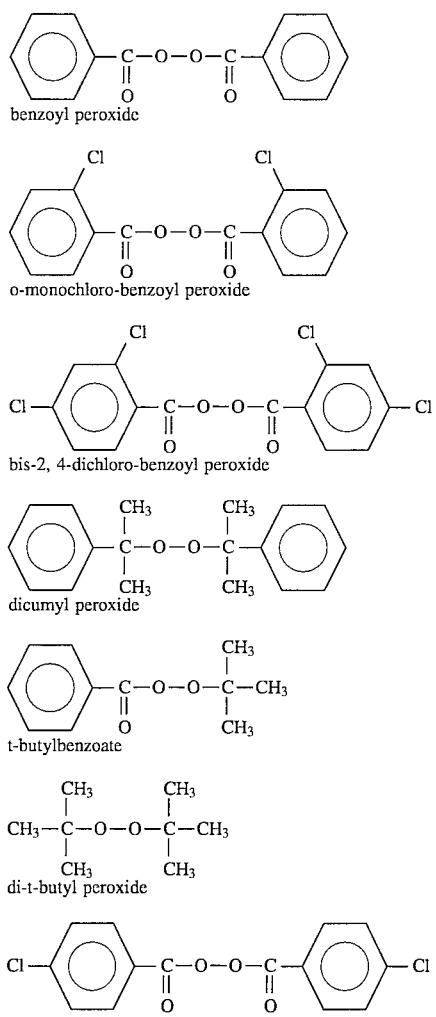

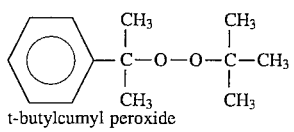
t-butylcumyl peroxide

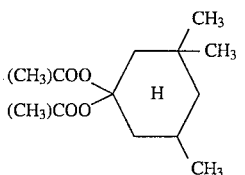
1, 1-bis(t-butylperoxy)-3, 3, 5-trimethylcyclohexane

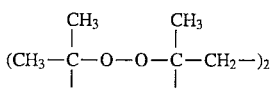
2, 5-dimethyl-2, 5-bis(t-butylperoxy)hexane

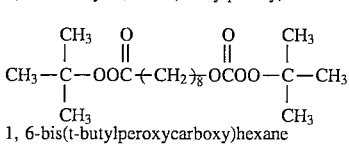
1, 6-bis(t-butylperoxycarboxy)hexane

The amount of the organic peroxide (b) added is a catalytic amount. It may be properly selected in accordance with a desired curing rate although it generally ranges from about 0.1 to 10 parts, preferably from about 0.2 to 2 parts weight per 100 parts by weight of component (a) or organopolysiloxane.

In addition to main components (a) and (b), the organic peroxide-curable silicone rubber composition may contain a filler, preferably having a specific surface area of 50 m²/g or more, more preferably 50 to 400 m²/g by BET method for the purposes of controlling flow or improving the mechanical strength of molded parts. Exemplary fillers include reinforcing fillers such as precipitated silica, fumed silica, fired silica, and fumed titanium oxide; and non-reinforcing fillers such as ground quartz, diatomaceous earth, asbestos, aminosilicic acid, iron oxide, zinc oxide, and calcium carbonate. The fillers may be used with or without surface treatment with organic silicon compounds such as hexamethylsilazane, trimethylchlorosilane, and polymethylsiloxane. If desired, the silicone rubber composition may further contain pigments, heat resistant agents, flame retardants, and plasticizers which are often blended in conventional silicone rubbers.

Desirably the organic peroxide-curable silicone rubber composition is a liquid or paste at room temperature.

The addition reaction-cured silicone rubber is preferably obtained by curing a silicone rubber composition predominantly comprising (a) 100 parts by weight of an organopolysiloxane having the following general formula (1):

wherein $R^1$ is a substituted or unsubstituted monovalent hydrocarbon group having 1 to 10 carbon atoms, preferably 1 to 8 carbon atoms, 0.01 to 20 mol % of $R^1$ is an alkenyl group, and letter a is a positive number of from 1.9 to 2.4, and containing on average at least two alkenyl groups in a molecule, and (c) 0.1 to 30 parts by weight of an organohydrogenpolysiloxane having the following general formula (2):

wherein $R^2$ is a substituted or unsubstituted monovalent hydrocarbon group having 1 to 10 carbon atoms, preferably 1 to 8 carbon atoms, letter b ranges from 0.8 to 2.1, letter c ranges from 0.005 to 1, and the sum of b and c is 0.9 to 3, which is liquid at room temperature, and (d) a catalytic amount of an addition reaction catalyst.

Component (a), the alkenyl group-containing organopolysiloxane, is the same as component (a) previously described in conjunction with the organic peroxide-curable silicone rubber composition.

In component (c), the organohydrogenpolysiloxnane, of formula (2), $R^2$ is the same as $R^1$, preferably a group free of an aliphatic unsaturated bond. Letters b and c are in the range: $0.8 \leq b \leq 2.1$, $0.005 \leq c \leq 1$, and $0.9 \leq b+c \leq 3$, preferably $1 \leq b \leq 2$, $0.01 \leq c \leq 1$, $1.5 \leq b+c \leq 2.6$, more preferably $1.8 \leq b+c \leq 2.2$.

In the organohydrogenpolysiloxane (component (c)), the hydrogen atoms are directly bonded to silicon atoms at the molecule ends and/or in the intermediate portion of the main chain of the molecule. Its molecular structure is not critical and any of commonly available organohydrogenpolysiloxanes, for example, of a straight chain, branched, cyclic or three-dimensional resinous structure may be used. The number of silicon atoms in the molecule is preferably 2 to 500, more preferably 4 to 200. The number of hydrogen atoms each directly bonded to a silicon atom (i.e. SiH group) is at least 2, preferably 2 to 500, more preferably 3 to 200.

Examples of the organohydrogenpolysiloxane include both end trimethylsiloxy group-blocked methylhydrogenpolysiloxane, both end trimethylsiloxy group-blocked dimethylsiloxane/methylhydrogenpolysiloxane copolymers, both end dimethylhydrogensiloxy group-blocked dimethylsiloxane, both end dimethylhydrogenpolysiloxy group-blocked dimethylsiloxane/methylhydrogenpolysiloxane copolymers, both end trimethylsiloxy group-blocked methylhydrogenpolysiloxane/diphenylsiloxane/dimethylsiloxane copolymers, copolymers of $(CH_3)_2HSiO_{1/2+cc}$ and $SiO_{4/2}$ units, and copolymers of $(CH_3)_2HSiO_{+c,\text{fra }1/2}$, $SiO_{4/2}$, and $(C_6H_5)SiO_{3/2}$ units.

The amount of component (c), the organohydrogenpolysiloxane blended is 0.1 to 30 parts, preferably 0.3 to 10 parts by weight per 100 parts by weight of component (a), the organopolysiloxane. Or, component (c) may be used in such an amount that the amount of silicon-bonded hydrogen atoms (i.e. SiH groups) in component (c) is 0.5 to 5 moles, preferably 0.8 to 3 moles per 1 mole of alkenyl group in component (a).

Component (d) is an addition reaction catalyst which includes platinum series metal compounds such as platinum black, platinum tetrachloride, reaction products of chloroplatinic acid with monohydric alcohols, complexes of chloroplatinic acid with olefins, platinum bisacetoacetate, palladium catalysts, and rhodium catalysts. The amount of the addition reaction catalyst added is a catalytic amount, for example, 0.1 to 500 ppm, especially 1 to 100 ppm of metallic platinum or rhodium based on the weight of component (a).

Like the organic peroxide-curable silicone rubber composition mentioned previously, the addition reaction-curable silicone rubber composition may contain fillers and additives in addition to the main components.

Desirably the addition reaction-curable silicone rubber composition is a liquid or paste at room temperature.

The cured epoxy resin is preferably obtained by curing an epoxy resin composition predominantly comprising (A) 100 parts by weight of an epoxy resin, (B) 0.001 to 10 parts by weight of an aluminum compound, (C) 0.1 to 25 parts by weight of an organosilane or organopolysiloxane having at least one hydroxy group bonded to a silicon atom (i.e. silanol group) therein represented by the following general formula (3):

$$R_m^3(HO)_nSiO_{(4-m-n)/2} \quad (3)$$

wherein $R^3$ is a substituted or unsubstituted monovalent hydrocarbon group having 1 to 20, preferably 1 to 10 carbon atoms, letter m is $0 < m \leq 3$, letter n is $0 < n \leq 3$, and the sum of m and n is 1.5 to 4, and (D) 0.2 to 25 parts by weight of an organohydrogenpolysiloxane containing in a molecule at least one hydrogen atom bonded to a silicon atom (i.e. SiH group) represented by the following general formula (4):

$$R_p^4H_qSiO_{(4-p-q)/2} \quad (4)$$

wherein $R^4$ is a substituted or unsubstituted monovalent hydrocarbon group having 1 to 10 carbon atoms, preferably 1 to 8 carbon atoms, letter p is $0 < p < 3$, letter q is $0 < q < 3$, and the sum of p and q is 1.5 to 2.6.

The epoxy resin as component (A) is any of the epoxy resins commonly used in conventional epoxy resin compositions. Examples include bisphenol-A type epoxy resins, bisphenol-F type epoxy resins, phenol novolak type epoxy resins, alicyclic epoxy resins, epoxy resins containing a hetero-ring such as triglycidyl isocyanate or hydantoin epoxy, hydrogenated bisphenol-A type epoxy resins, aliphatic epoxy resins such as propylene glycol diglycidyl ether and pentaerythritol polyglycidyl ether, epoxy resins obtained by reacting aromatic, aliphatic or alicyclic carboxylic acids with epichlorohydrin, spiro-ring-containing epoxy resins, glycidyl ether type epoxy resins in the form of reaction products of o-allylphenol novolak compounds with epichlorohydrin, and glycidyl ether type epoxy resins in the form of reaction products of diallylbisphenol compounds (having allyl groups at the ortho-positions of bisphenol-A relative to its hydroxyl groups) with epichlorohydrin.

Component (B) is an organic aluminum compound which is a compound having an organic group attached to a aluminum. The organic groups include alkyl, phenyl, substituted phenyl, haloalkyl, alkoxy, phenoxy, substituted phenoxy, acyloxy, β-diketonato, and o-carbonylphenolato groups. More illustratively, the alkyl groups include those having 1 to 10 carbon atoms, such as methyl, ethyl, n-propyl, isopropyl, n-butyl, sec-butyl, t-butyl and n-pentyl groups. The substituted phenyl groups include phenyl groups having an alkoxy substituent of 1 to 10 carbon atoms, such as p-methoxyphenyl, o-methoxyphenyl, and p-ethoxyphenyl. The haloalkyl groups include those having 1 to 10 carbon atoms, such as chloromethyl, chloroethyl and chloropropyl groups. The alkoxy groups include those having 1 to 10 carbon atoms such as methoxy, ethoxy, isopropoxy, butoxy, and pentoxy groups. The substituted phenoxy groups include phenoxy groups having a lower alkyl, lower alkoxy or nitro substituent, such as o-methylphenoxy, o-methoxyphenoxy, o-nitrophenoxy, and 2,6-dimethylphenoxy groups. The acyloxy groups include those having 2 to 10 carbon atoms, such as acetato, propionato, isopropionato, butyrato, stearato, ethylacetoacetato, propylacetonato, butylacetonato, diethylmalato, and dipivaloylmethanato groups. The β-diketonato groups include acetylacetonato, trifluoroacetonato, and hexafluoroacetylacetonato groups. An exemplary o-carbonylphenolato group is a salicylaldehydato group.

Examples of the organoaluminum compound include trimethoxyaluminum, triethoxyaluminum, triisopropoxyaluminum, triphenoxyaluminum, tri(p-methylphenoxy)aluminum, isopropoxy-diethoxyaluminum, tributoxyaluminum, triacetoxyaluminum, tristearatoaluminum, tributyratoaluminum, tripropionatoaluminum, triisopropionatoaluminum, tris(acetylacetonato)aluminum, tris(trifluoroacetylacetonato)aluminum, tris(salicylaldehyde)aluminum, tris(pentafluoroacetylacetonato)aluminum, tris(ethylacetato)aluminum, ethylacetatodiisopropoxyaluminum, tris(diethylmalonato)aluminum, tris(propylacetato)aluminum, tris(butylacetoacetato)aluminum, tris(isopropylacetoacetato)aluminum, tris(dipivaloylmethanato)aluminum, diacetylacetonatodipivaloylmethanatoaluminum, and ethylacetoacetatodiisopropoxyaluminum. The following compounds are also useful.

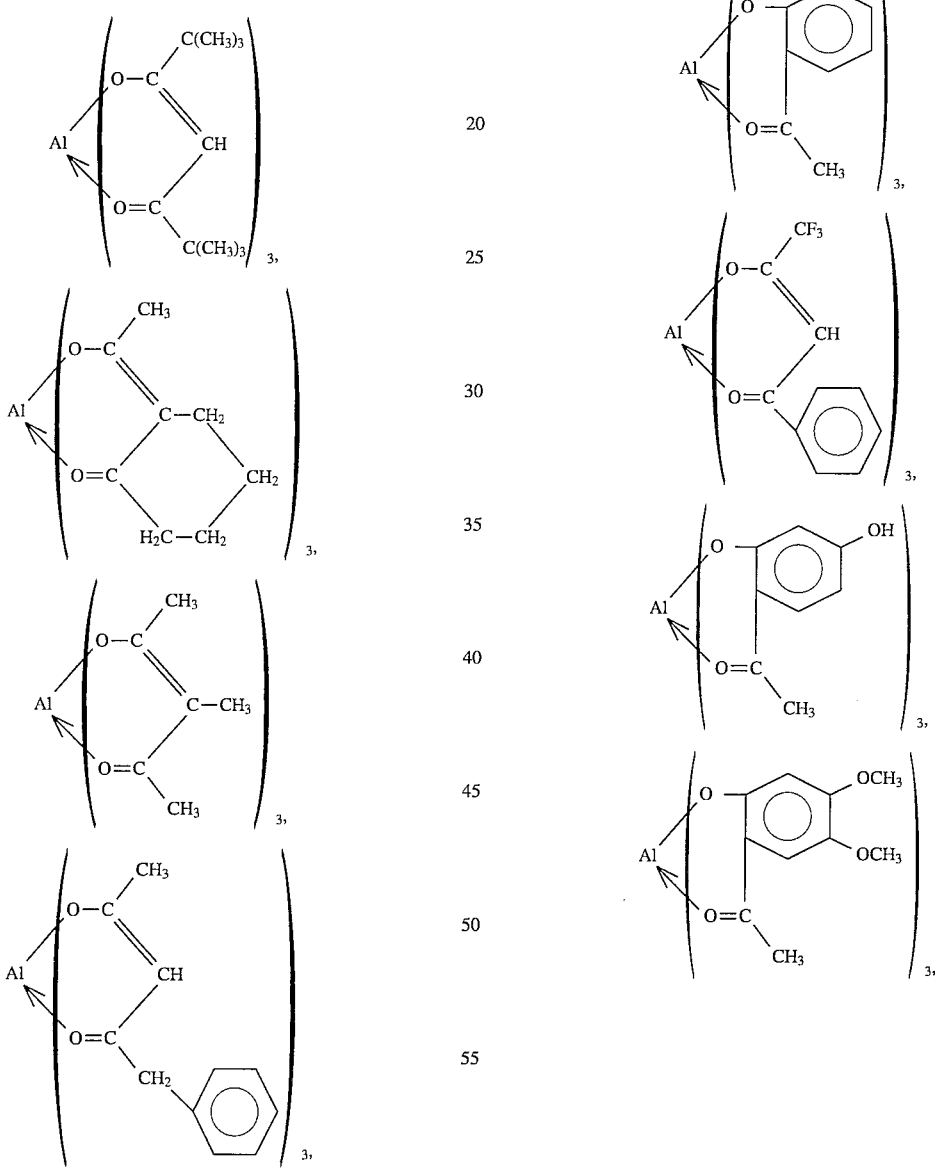

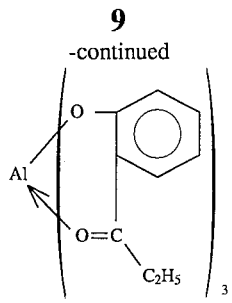

The organoaluminum compounds may be used alone or in admixture of two or more as component (B). The amount of component (B) blended is 0.001 to 10 parts, preferably 1 to 5 parts by weight per 100 parts by weight of component (A) or epoxy resin. On this basis, less than 0.001 part of component (B) fails to achieve satisfactory curing whereas more than 10 parts of component (B) raises the cost and adversely affects physical properties and adhesion.

Component (C) is an organosiloxane or organopolysiloxane which reacts with the organoaluminum compound of component (B) to promote curing of the epoxy resin. It is an organosilane compound or organopolysiloxane having at least one silanol group in a molecule. More particularly, component (C) is an organosilane or organopolysiloxane containing in a molecule one or more hydroxyl groups each bonded to a silicon atom (i.e. silanol group) represented by the following general formula (3). The organopolysiloxane may be linear, branched or cyclic. The number of silicon atoms is 2 to 500, preferably 2 to 100 in the molecule.

$$R_m^3(HO)_n SiO_{(4-m-n)/2} \quad (3)$$

$R^3$ is a substituted or unsubstituted monovalent hydrocarbon group having 1 to 20 carbon atoms, especially 1 to 10 carbon atoms. The hydrocarbon groups represented by $R^3$ include alkyl groups such as methyl, ethyl, propyl, butyl, hexyl, octyl, decyl, undecyl, dodecyl, and ocatadecyl groups; cycloalkyl groups such as cyclohexyl and cyclooctyl groups; aryl groups such as phenyl, naphthyl, anthranyl, methylphenyl and xylyl groups; aralkyl groups such as benzyl, phenylethyl and cumyl groups; alkenyl groups such as vinyl, allyl and cyclohexenyl groups; substituted ones of the foregoing groups wherein some or all of the hydrogen atoms are replaced by halogen atoms or cyano groups, such as chloromethyl, bromoethyl, p-chlorophenyl, o-chlorophenyl, p-trifluoropropyl, o-trifluoromethylphenyl, 3,3,3-trifluoropropyl, and cyanoethyl groups; trimethylsilyl or trialkoxysilyl substituted hydrocarbon groups such as β-trimethylsilylethyl, γ-trimethylsilylpropyl, β-trimethoxysilylethyl, β-triethoxysilylethyl, γ-trimethoxysilylpropyl, and γ-triethoxysilylpropyl groups; and epoxy substituted hydrocarbon groups such as γ-glycidoxypropyl and γ-(3,4-epoxycyclohexyl)ethyl groups. Preferably $R^3$ is a group containing no aliphatic unsaturated bond, for example, alkyl groups such as methyl or aryl groups such as phenyl. Letter m and m in the general formula (3) are in the range: $0<m\leq 3$, $0<n\leq 3$, and $1.5\leq m+n\leq 4$, preferably $2\leq m+n\leq 4$.

Particularly, in component (C), m is 1, 2 or 3, n is 1, 2 or 3 and m+n=4 in case of the organosilane compound, and $1\leq m<3$, $0<n\leq 2$, $1.5\leq m+n\leq 3$, preferably $2\leq m+n\leq 3$ in case of the organosiloxane compound.

Typical examples of component (C) are given below.

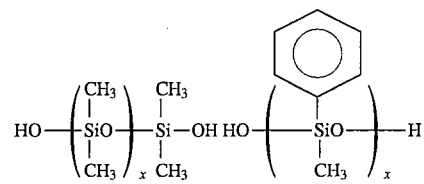

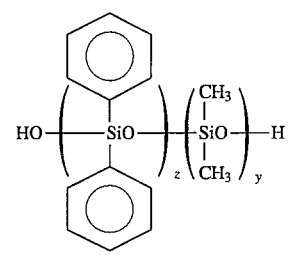

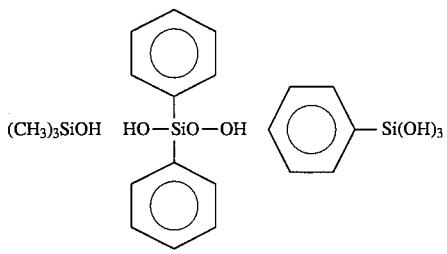

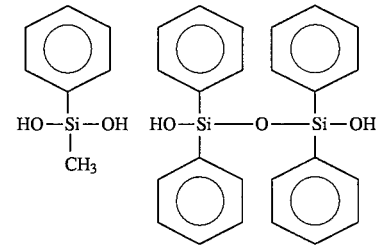

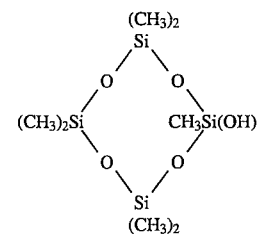

In the above formulae, x is an integer of 1 to 500, preferably 1 to 100, and y and z are integers satisfying $y\geq 0$, $z\geq 1$ and $1\leq y+z\leq 500$.

The organosilanes and organopolysiloxanes may be used alone or in admixture of two or more as component (C). The amount of component (C) blended is 0.1 to 25 parts, preferably 0.5 to 20 parts by weight per 100 parts by weight of component (A) or epoxy resin. On this basis, less than 0.1 part of component (C) is ineffective whereas more than 25 parts of component (C) can adversely affect the inherent properties of the epoxy resin.

The epoxy resin composition further contains component (D) which is an organohydrogenpolysiloxane having at least one hydrogen atom bonded to a silicon atom in a molecule. More particularly, it is an organopolysiloxane containing one or more hydrogen atoms each bonded to a silicon atom (i.e. SiH group) therein, represented by the following general formula (4) in a molecule. This organopolysiloxane may be linear, branched or cyclic. The number of silicon atoms in the molecule is 2 to 50, preferably 2 to 30. The number of silicon-bonded hydrogen atoms (SiH groups) in the molecule is at least one, preferably 2 to 30.

$$R_p^4 H_q SiO_{(4-p-q)/2} \quad (4)$$

$R^4$ is a substituted or unsubstituted monovalent hydrocarbon group having 1 to 10, preferably 1 to 8 carbon atoms as defined for $R^3$, and letters p and q are in the range: $0<p<3$, $0<q<3$, and $1.5 \leq p+q \leq 2.6$.

Preferably, the organohydrogenpolysiloxane of component (D) has at least one alkoxy functional group including trialkoxysilyl-substituted hydrocarbon groups such as γ-trimethoxysilyl propyl group, γ-triethoxysilylpropyl group, γ-trimethoxysilylethyl group and γ-triethoxysilylethyl group, or at least one epoxy functional group including epoxy-substituted hydrocarbon groups such as γ-glycidoxypropyl group and β-(3,4-epoxycyclohexyl)ethyl group.

Typical examples of the organohydrogenpolysiloxane are given below.

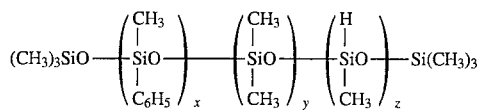

(x, y and z are integers satisfying $x \geq 1$, $y \geq 0$, $z \geq 1$ and $2 \leq x+y+z \leq 50$, particularly $2 \leq x+y+z \leq 30$)

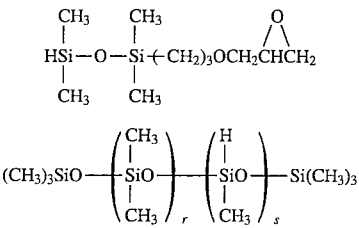

(r and s are integers satisfying $r \geq 0$, $s \geq 1$, and $1 \leq r+s \leq 50$, particularly $1 \leq r+s \leq 30$)

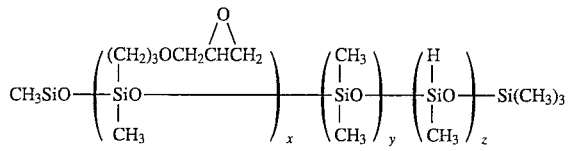

(x, y and z have the same meaning as above)

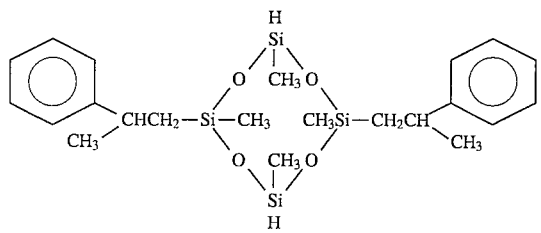

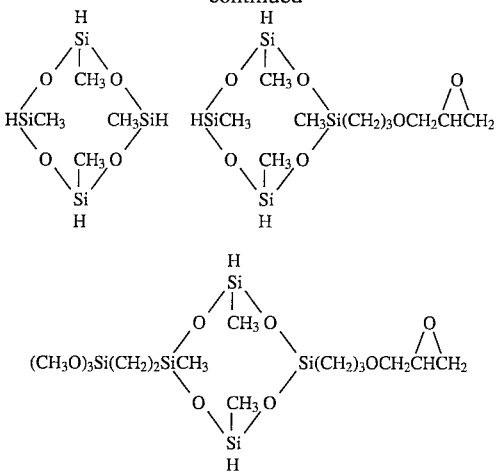

The organohydrogenpolysiloxane may be used alone or in admixture of two or more as component (D). The amount of component (D) blended is 0.2 to 25 pats, preferably 0.5 to 20 parts by weight per 100 parts by weight of component (A) or epoxy resin. On this basis, less than 0.2 part of component (D) is ineffective whereas more than 25 parts of component (D) can adversely affect the inherent properties of the epoxy resin.

In addition to the essential components mentioned above, the epoxy resin composition may contain a filler insofar as the adhesion of epoxy resin to silicone rubber is not impaired. Useful fillers include fused silica, crystalline silica, glass powder, glass fibers, clay, talc, mica, asbestos, zinc oxide, magnesia, aluminum silicate, zirconium silicate, alumina, and fumed silica, all in fine powder and fiber forms.

The silicone rubber/epoxy resin composite of the invention is prepared by molding and curing either one of the organic peroxide—or addition reaction-curable silicone rubber composition and the epoxy resin composition defined above at room temperature or elevated temperature. The molding technique may be selected in accordance with the viscosity of a composition to be molded, among casting compression molding, injection molding, extrusion molding and transfer molding, for example. After the primary molding is cured, the other composition is placed in close contact with the primary molding and cured at room temperature or elevated temperature, resulting in a composite wherein the cured epoxy resin is firmly and integrally joined with the silicone rubber. The secondary molding technique may also be selected in accordance with the viscosity of the composition to be molded, among casting, compression molding, injection molding, extrusion molding and transfer molding, for example. It is unnecessary that the primary molding has been completely cured when the secondary molding is cured. It is only required that the primary molding be cured to a sufficient extent to prevent intermixing of the two components and to establish an interface therebetween.

The primary and secondary moldings may have any desired shape. Any shape may be selected among sheet, plate, column, and block shapes as desired for the composite.

EXAMPLE

Examples of the present invention are given below by way of illustration and not by way of limitation. All parts are by weight. Viscosity is measured at 25° C.

Example 1

An epoxy resin composition (E) was formulated by adding 0.6 part of aluminum benzoate, 6.0 parts of diphenylsilane diol, and 5 parts of an organopolysiloxane of the formula shown below to 100 parts of Epikoat 828 (tradename of bisphenol-A type epoxy resin manufactured by Shell Chemical, epoxy equivalent 190–210, molecular weight 380).

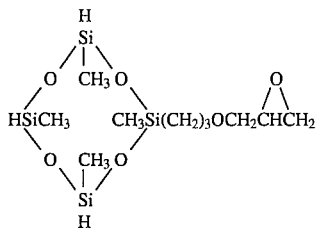

Separately, a silicone rubber composition (Sa) was formulated by combining 100 parts of a dimethylpolysiloxane blocked with a dimethylvinylsilyl group at each end of a molecular chain and having a viscosity of 100 poise, 30 parts of fumed silica having a specific surface area of 200 m²/g, 6 parts of hexamethylsilazane, and 2 parts of water, heating and mixing them at 150° C. for 3 hours, and further adding thereto 50 parts of the dimethylpolysiloxane having a viscosity of 100 poise, 0.4 part of a both end trimethylsilyl group-blocked methylhydrogenpolysiloxane copolymer (dimethylsiloxane unit 50 mol % and methylhydrogensiloxane unit 50 mol %) having a viscosity of 10 poise, and 0.1 part of an isopropanol solution of chloroplatinic acid (platinum content 0.50% by weight).

Using a mold as shown in FIG. 1, an integral composite of epoxy resin and silicone rubber was molded. First, the epoxy resin composition (E) was poured into a cavity 2 of a lower mold 1 to about one-half of its volume. The epoxy resin composition (E) was cured by heating at 150° C. for 3 minutes. An upper mold 3 was placed on the lower mold 1 to close the cavity 2. The silicone rubber composition (Sa) was injected onto the cured epoxy resin composition (E) through a port 4 in the upper mold 3 under an injection pressure of about 60 kg/cm². The silicone rubber composition (Sa) was cured by heating at 150° C. for 5 minutes, obtaining an integral composite in which the epoxy resin was firmly integrated with the silicone rubber. The integral composite was subject to a tensile shear strength test to find rubber fracture of 100% cohesive failure.

Example 2

A silicone rubber composition (Sp) was formulated by combining 100 parts of a dimethylpolysiloxane blocked with a trivinylsiloxy group at each end of a molecular chain and having a viscosity of 1,000 poise, 30 parts of fumed silica having a specific surface area of 200 m²/g, 6 parts of hexadimethyldisilazane, and 2 parts of water, heating and mixing them at 150° C. for 3 hours, and further adding thereto 50 parts of the dimethylpolysiloxane having a viscosity of 1,000 poise and 1.0 part of 1,6-bis(t-butylperoxy)hexane.

As in Example 1, the epoxy resin composition (E) was poured into the cavity 2 of the lower mold 1 and cured by heating at 170° C. for 2 minutes. With the cavity 2 closed, the silicone rubber composition (Sp) was injected onto the cured epoxy resin composition (E) and cured by heating at 170° C. for 5 minutes, obtaining an integral composite in which the epoxy resin was firmly integrated with the silicone rubber. A tensile shear strength test showed rubber fracture of 100% cohesive failure.

There has been described an integral composite in which a cured product of an epoxy resin composition and a cured product of an organic peroxide—or addition reaction-curable silicone rubber composition are integrally and firmly joined together although they are difficult to join together or can be joined together through complex steps as by interposing a primer layer in the prior art. An integral composite having a practically acceptable adhesion force can be simply and briefly produced without using a primer. Efficient production of integral composites of a complex shape insures their applications in the fields of electric and electronic parts, business machines, automobiles, and precision equipment.

Japanese Patent Application No. 6-79819 is incorporated herein by reference.

While this invention has been described with respect to a preferred embodiment, it will be understood by those skilled in the art that various changes and modifications may be made without departing from the spirit and scope of the invention.

We claim:

1. An integral composite comprising an organic peroxide-cured or addition reaction-cured silicone rubber part and a cured epoxy resin part, said cured epoxy resin part being obtained by curing an epoxy resin composition predominantly comprising (A) 100 parts by weight of an epoxy resin, (B) 0.001 to 10 parts by weight based on 100 parts by weight of the epoxy resin of an aluminum compound, (C) 0.1 to 25 parts by weight based on 100 parts by weight of the epoxy resin of an organosilane or organopolysiloxane containing in a molecule at least one silanol group represented by the following general formula (3):

$$R_m^3(HO)_n SiO_{(4-m-n)/2} \qquad (3)$$

wherein $R^3$ is a halo-, cyano-, trimethylsilyl-, trialkoxysilyl- or epoxy-substituted or unsubstituted monovalent hydrocarbon group having 1 to 20 carbon atoms, letter m is $0<m\leq 3$, letter n is $0<n\leq 3$, and the sum of m and n is 1.5 to 4, and (D) 0.2 to 25 parts by weight based on 100 parts by weight of the epoxy resin of an organohydrogenpolysiloxane containing in a molecule at least one hydrogen atom bonded to a silicon atom and at least one trialkoxysilyl functional or epoxy functional group represented by the following general formula (4):

$$R_p^4 H_q SiO_{(4-p-q)/2} \qquad (4)$$

wherein $R^4$ is a trialkoxysilyl- or epoxy-substituted or unsubstituted monovalent hydrocarbon group having 1 to 10 carbon atoms, letter p is $0<p<3$, letter q is $0<q<3$, and the sum of p and q is 1.5 to 2.6.

2. The composite of claim 1 wherein said silicone rubber part is an organic peroxide-cured silicone rubber obtained by curing a silicone rubber composition predominantly comprising (a) an organopolysiloxane having the following general formula (1):

$$R_a^1 SiO_{(4-a)/2} \qquad (1)$$

wherein $R^1$ is a halo- or cyano-substituted or unsubstituted monovalent hydrocarbon group having 1 to 10 carbon atoms, 0.005 to 20 mol % of $R^1$ is an alkenyl group, and letter a is a positive number of from 1.9 to 2.4, and containing on average at least two alkenyl groups in a molecule, and (b) a catalytic amount of an organic peroxide.

3. The composite of claim 1 wherein said silicone rubber part is an addition reaction-cured silicone rubber obtained by curing a silicone rubber composition predominantly comprising (a) 100 parts by weight of an organopolysiloxane having the following general formula (1):

$$R_a^1SiO_{(4-a)/2} \qquad (1)$$

wherein $R^1$ is a halo- or cyano-substituted or unsubstituted monovalent hydrocarbon group having 1 to 10 carbon atoms, 0.01 to 20 mol % of $R^1$ is an alkenyl group, and letter a is a positive number of from 1.9 to 2.4, and containing on average at least two alkenyl groups in a molecule, (c) 0.1 to 30 parts by weight based on 100 parts by weight of the organopolysiloxane of an organohydrogenpolysiloxane having the following general formula (2):

$$R_b^2H_cSiO_{(4-b-c)/2} \qquad (2)$$

wherein $R^2$ is a halo- or cyano-substituted or unsubstituted monovalent hydrocarbon group having 1 to 10 carbon atoms, letter b ranges from 0.8 to 2.1, letter c ranges from 0.005 to 1, and the sum of b and c is 0.9 to 3, said organohydrogenpolysiloxane being liquid at room temperature, and (d) a catalytic amount of an addition reaction catalyst.

4. The composite of claim 1, wherein the organohydrogenpolysiloxane of component (D) is one having 2 to 30 silicon-bonded hydrogen atoms in a molecule.

5. The composite of claim 1, wherein the aluminum compound, (B), is an organic aluminum compound having an alkyl, phenyl, alkoxy substituted phenyl, haloalkyl, alkoxy, phenoxy, lower alkyl, lower alkoxy or nitro substituted phenoxy, acyloxy, β-diketonato or o-carbonylphenolato organic group attached to aluminum.

6. The composite of claim 1, wherein the silicone rubber part and the epoxy resin part are in the shape of a sheet, plate, column or block.

7. A method for preparing a silicone rubber/epoxy resin integral composite comprising an organic peroxide-cured or addition reaction-cured silicone rubber part and a cured epoxy resin part, which parts are not intermixed, firmly joined together along an interface between the parts, which process comprises:

(a) providing either the cured silicone rubber part or the cured epoxy resin part, (b) bringing an uncured or partially cured curable composition for the silicone rubber part or epoxy resin part not provided in (a) into contact with the part provided in (a) along the interface, and (c) curing said curable composition such that an integral composite comprising the silicone rubber part and the epoxy resin part, which parts are not intermixed, firmly joined together along the interface between the two parts is produced, wherein said epoxy resin part is obtained by curing an epoxy resin composition predominantly comprising (A) 100 parts by weight of an epoxy resin, (B) 0.001 to 10 parts by weight based on 100 parts by weight of the epoxy resin of an aluminum compound, (C) 0.1 to 25 parts by weight based on 100 parts by weight of the epoxy resin of an organosilane or organopolysiloxane containing in a molecule at least one silanol group represented by the following general formula (3):

$$R_m^3H(HO)_nSiO_{(4-m-n)/2} \qquad (3)$$

wherein $R^3$ is a halo-, cyano- trimethylsilyl-, trialkoxysilyl- or epoxy-substituted or unsubstituted monovalent hydrocarbon group having 1 to 20 carbon atoms, letter m is 0<m<3, letter n is 0<n<3, and the sum of m and n is 1.5 to 4, and (D) 0.2 to 25 parts by weight based on 100 parts by weight of the epoxy resin of an organohydrogen polysiloxane containing in a molecule at least one hydrogen atom bonded to a silicon atom and at least one trialkoxysilyl functional or epoxy functional group represented by the following general formula (4):

$$R_p^4H_qSiO_{(4-p-q)/2} \qquad (4)$$

wherein $R^4$ is a trialkoxysilyl- or epoxy-substituted or unsubstituted monovalent hydrocarbon group having 1 to 10 carbon atoms, letter p is 0<p<3, letter q is 0<q<3, and the sum of p and q is 1.5 to 2.6.

8. The process of claim 7, wherein said silicone rubber part is an organic peroxide-cured silicone rubber obtained by curing a silicone rubber composition predominantly comprising (a) an organopolysiloxane having the following general formula (1):

$$R_a^1SiO_{(4-a)/2} \qquad (1)$$

wherein $R^1$ is a halo- or cyano-substituted or unsubstituted monovalent hydrocarbon group having 1 to 10 carbon atoms, 0.005 to 20 mol % of $R^1$ is an alkenyl group, and letter a is a positive number of from 1.9 to 2.4, and containing on average at least two alkenyl groups in a molecule, and (b) a catalytic amount of an organic peroxide.

9. The process of claim 7, wherein said silicone rubber part is an addition reaction-cured silicone rubber obtained by curing a silicone rubber composition predominantly comprising (a) 100 parts by weight of an organopolysiloxane having the following general formula (1):

$$R_a^1SiO_{(4-a)/2} \qquad (1)$$

wherein $R^1$ is a halo- or cyano-substituted or unsubstituted monovalent hydrocarbon group having 1 to 10 carbon atoms, 0.01 to 20 mol % of $R^1$ is an alkenyl group, and letter a is a positive number of from 1.9 to 2.4, and containing on average at least two alkenyl groups in a molecule, (c) 0.1 to 30 parts by weight based on 100 parts by weight of the organopolysiloxane of an organohydrogenpolysiloxane having the following general formula (2):

$$R_b^2H_cSiO_{(4-b-c)/2} \qquad (2)$$

wherein $R^2$ is a halo- or cyano-substituted or unsubstituted monovalent hydrocarbon group having 1 to 10 carbon atoms, letter b ranges from 0.8 to 2.1, letter c ranges from 0.005 to 1, and the sum of b and c is 0.9 to 3, said organohydrogenpolysiloxane being liquid at room temperature, and (d) a catalytic amount of an addition reaction catalyst.

10. The process of claim 7, wherein the parts are firmly joined together without the use of a primer.

11. The process of claim 7, wherein the curing, (c), is conducted at room temperature.

* * * * *